United States Patent [19]

Tiegs

[11] Patent Number: 4,652,413
[45] Date of Patent: Mar. 24, 1987

[54] METHOD FOR PREPARING CONFIGURED SILICON CARBIDE WHISKER-REINFORCED ALUMINA CERAMIC ARTICLES

[75] Inventor: Terry N. Tiegs, Lenoir City, Tenn.

[73] Assignee: The United States of America as represented by the United States Department of Energy, Washington, D.C.

[21] Appl. No.: 787,897

[22] Filed: Oct. 16, 1985

[51] Int. Cl.$^4$ .................... C04B 35/10; C04B 35/56
[52] U.S. Cl. ........................................ 264/66; 501/89; 501/95; 264/65; 264/570
[58] Field of Search ............... 501/95, 89; 264/66, 264/65, 570

[56] References Cited

U.S. PATENT DOCUMENTS 4,507,224  3/1985  Toibana et al. ............... 501/89
4,543,345  9/1985  Wei ............................. 501/95

*Primary Examiner*—Mark L. Bell
*Attorney, Agent, or Firm*—Earl L. Larcher; Stephen D. Hamel; Judson R. Hightower

[57] ABSTRACT

A ceramic article of alumina reinforced with silicon carbide whiskers suitable for the fabrication into articles of complex geometry are provided by pressureless sintering and hot isostatic pressing steps. In accordance with the method of the invention a mixture of 5 to 10 vol. % silicon carbide whiskers 0.5 to 5 wt. % of a sintering aid such as yttria and the balance alumina powders is ball-milled and pressureless sintered in the desired configuration in the desired configuration an inert atmosphere at a temperature of about 1800° C. to provide a self-supporting configured composite of a density of at least about 94% theoretical density. The composite is then hot isostatically pressed at a temperature and pressure adequate to provide configured articles of at least about 98% of theoretical density which is sufficient to provide the article with sufficient strength and fracture toughness for use in most structural applications such as gas turbine blades, cylinders, and other components of advanced heat engines.

6 Claims, No Drawings

METHOD FOR PREPARING CONFIGURED SILICON CARBIDE WHISKER-REINFORCED ALUMINA CERAMIC ARTICLES

This invention was made as a result of work under Contract DE-AC05-840R21400 between Martin Marietta Energy Systems, Inc. and the U.S. Department of Energy.

BACKGROUND OF THE INVENTION

The present invention relates generally to the preparation of silicon carbide whisker-reinforced alumina ceramic articles, and more particularly to a method of preparing such articles in preselected configurations by pressureless, liquid-phase sintering selected compositions of the whiskers and alumina particulates and then hot isostatically pressing the sintered composites to provide a configured article of near theoretical density.

Reinforced ceramic composites are receiving increasing interest in applications requiring properties such as high chemical, wear and erosion resistance and good structural integrity at high temperatures such as present in heat engines and the like. Such reinforced ceramics are presently being considered as suitable structural materials for the fabrication of turbocharger rotors, cylinders, bearings, and other components of heat engines which will enable the heat engines to run more efficiently at higher temperatures than heretofore possible with similar components formed of metal. Particularly useful reinforced ceramic material have been provided by reinforcing various refractory oxides such as alumina ($Al_2O_3$) with silicon carbide (SiC) whiskers which function to substantially increase the fracture toughness of the ceramic and thereby effectively inhibit deleterious crack formation and crack growth due to material fatigue. Such SiC whisker-reinforced ceramics are described and claimed in assignee's allowed copending U.S. patent application Ser. No. 578,407 filed Feb. 9, 1984 entitled "Silicon Carbide Whisker-Reinforced Composites and Method for Making Same". In this copending patent application the ceramic composites which exhibit increased fracture toughness and resistance to cracking are prepared by forming a mixture of particulate ceramic material such as $Al_2O_3$, $3Al_2O_3 \cdot 2SiO_2$, or boron carbide ($B_4C$) and about 5 to 60 vol. % of SiC whiskers. These whiskers have a monocrystalline structure and are of a size of about 0.6 micrometers in diameter and a length in the range of about 10 to 80 micrometers. This whisker-ceramic particulate mixture is then hot-pressed at a pressure in the range of about 28 to 70 MPa and at a temperature in the range of about 1600° to 1900° C. for a duration of about 0.75 to 2.5 hours to provide a whisker-reinforced composite with a density greater than about 99% of the theoretical density of the ceramic matrix material. Inasmuch as the whiskers, ceramic materials and the blending procedures as well as the physical and chemical properties described in assignee's aforementioned co-pending patent application are essentially similar to those utilized and achieved in the present invention, assignee's co-pending application is incorporated herein by reference.

While the SiC whisker-reinforced ceramic composite provided by the practice of the method described in assignee's aforementioned application provided articles of significantly increased strength and fracture toughness over conventional ceramics, the fabrication process was limited to the formation of articles with relatively simple shapes. The hot pressing of the whisker-ceramic particulate mixture in die sets inhibited the fabrication of articles with relatively complex shapes such as turbocharger rotors, cylinders, bearings, and the like and required extensive machining and other finishing processes which considerably increased the expense of fabricating structural components of complex shapes. However, the demand for fracture resistant and toughened structural ceramic articles of shaped configurations enhanced the desirability of a fabrication technique wherein products of relatively complex geometries such as mentioned above can be economically fabricated.

SUMMARY OF THE INVENTION

Accordingly, it is the primary objective of the present invention to provide a method for preparing SiC whisker-ceramic articles of relatively complex and preselected configurations or shapes by pressureless sintering shaped composite followed by a hot isostatic pressing for final densification. The utilization of the pressureless sintering step allows for the SiC whisker-ceramic particulate mixture to be readily formed in a suitable mold into a composite of the desired configuration with the sintered composite having sufficient structural integrity and high density to be isostatically hot pressed into a shaped article of near theoretical density and near-final dimensions. Generally, the method for fabricating SiC whisker-reinforced ceramic articles of preselected configurations from SiC whiskers and ceramic powder mixtures comprises the steps of forming a homogeneous mixture containing about 5 to 10 vol. % SiC whiskers which have a monocrystalline structure and are of a size of about 0.6 micrometers in diameter and about 10 to 80 micrometers in length, about 0.5 to 5 wt. % of yttria and the balance $Al_2O_3$ particles of an average particle size from 0.1 to 1 micrometers. This mixture is shaped into a preselected configuration with a pressed density of at least about 50 percent of theoretical density and then heated at essentially atmospheric pressure in an inert atmosphere to a temperature greater than about 1760° C. and adequate to effect liquid-phase sintering of alumina particulates to provide a self-supporting composite of an alumina matrix with SiC whiskers randomly dispersed therein. The composite upon completion of the pressureless sintering step is of a density of at least about 94% of the theoretical density of SiC-alumina. This composite is thereafter hot isostatically pressed at a temperature and pressure adequate to increase the density of the composite to at least about 98% of the theoretical density of the alumina.

The fabrication process of the present invention provides a very economical procedure by which complex shapes of SiC whisker-reinforced ceramic articles may be readily fabricated. These articles possess the structural integrity, fracture toughness, and other similarly desirable properties afforded by the composites produced in accordance with the teachings in assignee's aforementioned co-pending application.

Other and further objects of the invention will be obvious upon an understanding of the illustrative method about to be described or will be indicated in the appended claims, and various advantages not referred to herein will occur to one skilled in the art upon employment of the invention in practice.

DETAILED DESCRIPTION OF THE INVENTION

As generally described above, the present invention is directed to a method for preparing SiC whisker-reinforced alumina ceramic articles of relatively complex shapes at near theoretical density by employing a pressureless sintering step followed by a hot isostatic pressing step.

In accordance with the method of the present invention a SiC whisker-ceramic mixture is prepared by homogeneously forming a blend of 5 to 10 vol. % SiC whiskers, about 0.5 to about 5.0 wt. % of a liquid phase sintering promoter or agent, preferably yttria, and the balance alumina powder. The SiC whiskers are described in detail in assignee's aforementioned co-pending application. The liquid phase sintering promoting agent, yttria, is of a particulate form of a size range of about 1 to 3 micrometers. In addition, the yttria can be formed in-situ by adding yttrium nitrate and heating to temperatures greater than about 600° C. to decompose the nitrate. The alumina powder is preferably in a size range of about 0.1 to 1 micrometer. This mixture is homogeneously blended in a suitable manner such as in an ultrasonic high-shear mixer of a suitable, commercially available type. The blending of the mixture normally takes a duration of about 1 to 5 minutes. Upon completion of the blending the resulting mixture is preferably subjected to a wet milling in a ball mill operation for a duration of about 0.5 to 8 hours to lower the size distribution of the SiC whiskers and improve their packing efficiency for providing the final product with the desired high density and fracture toughness. The SiC whiskers prior to admixture with the alumina can be bleached with hydrogen fluoride to further increase the structural density of the composite. The dried powder mixture is then granulated to a size less than about 200 micrometers in diameter and preferably less than 60 micrometers. This step may be achieved by employing simple hand grinding and screening methods but suitable granulated powders should also be obtained by spray-drying the composite slurry.

The mixture is then placed in a suitable mold or other shapeforming mechanism and pressed at pressures from 10,000 to 60,000 psi to a density of at least about 50% of theoretical density. The pressed powder compact is then placed in a suitable crucible formed of a material such as $Al_2O_3$ which is capable of withstanding a temperature of 1,800° C. and covered with excess SiC whiskers or SiC powder. The loaded crucible is then placed in a suitable furnace and heated in an atmosphere of inert gas such as argon, nitrogen or helium to a temperature sufficient to effect pressureless liquid-phase sintering of the alumina particulates defining the matrix containing the dispersed silicon carbide whiskers. The sintering is achieved at atmospheric pressure since the application of pressure on complex shapes such as turbine blades or the like in the configured forms would require encapsulation of the article to effect densification. The pressureless sintering is effective to provide a self-supporting structure of the sintered ceramic with a density of at least about 94% of theoretical density. The sintering temperature is at least 1760°, and preferably is about 1800° C. for assuring sintering uniformity. The heating rate is preferably at a relatively rapid rate in the order of about 90 minutes from room temperature to about 1000° C. and then from about 1000° C. to 1800° C. in about 60 minutes. When reaching the final temperature a hold of about 1 minute to 15 minutes is desired to effect complete sintering. This rapid heating cycle minimizes grain growth and whisker decomposition.

The concentration of the silicon carbide whiskers in the composite is in the range of about 5 to 15 vol. % and preferably less than about 10 vol. % since it is found that pressureless sintered composites with a closed porosity and with a density of about at least 94% theoretical density can be achieved only with mixtures having a whisker concentration of less than about 10 vol. %. However, with whisker concentrations less than 5 vol. % there are insufficient whiskers available in the finished article to provide the desired fracture toughness and crack resistance.

Upon completion of the pressureless sintering operation the sintered composite is positioned in a gas autoclave for hot isostatic pressing in an atmosphere of argon at a temperature in a range of about 1,600° to 1,700° C. and a pressure loading of at least about 10,000 psi and in a range of about 10,000 to 30,000 psi. The hot isostatic pressing operation can be achieved without encapsulating the sintered composite since the latter possesses sufficient structural integrity to withstand the hot isostatic pressing operation. Upon completion of the hot isostatic pressing step which normally requires a duration of about 0.1 to 1 hour with pressure and temperatures in the range of about 20,000 to 30,000 psi, and 1,600 to 1,700° C., respectively, the articles are in the desired configuration at near final dimensions and have a density of about 98% or greater of theoretical density which is sufficient to provide the desired fracture toughness, crack resistance and structural integrity.

In order to provide a more facile understanding of the present invention an Example is set forth below directed to the preparation of pellets of an alumina matrix with 10 and 20 vol. % SiC whiskers plus yttria as the sintering aid.

EXAMPLE

A mixture of alumina and 10% whiskers and 2 wt. % yttria were cold pressed at 200 MPa into pellets of approximately 55 wt. % of theoretical density. An additional mixture of alumina with 20 vol. % silicon carbide whiskers and 2 wt. % of the yttria sintering aid were similarly cold pressed into pellets of approximately 55 wt. % of theoretical density. These pellets were sintered at atmospheric pressure at 1800° C. with some pellets in an atmosphere of argon and other in an atmosphere of helium. A testing of the pressureless sintered pellets indicated that the pellets containing the 10 vol. % SiC whiskers achieved densities of greater than 95% of theoretical density whereas the samples containing 20 vol. % SiC whiskers achieved densities no greater than about 75% of theoretical density. It is believed that the density of the 20 vol. % pellets could be improved with increased yttria content, acid leaching of the whiskers, or with wet-milling. However, it was further found that the pellets with whisker concentrations exceeding 10 vol. % may not be sinterable without pressure assistance which would significantly detract from the fabrication of the relatively complex shapes invisioned by the present invention. Upon completion of the pressureless sintering operation the pellets were subjected to a hot isostatic pressing operation in argon. The pellets were subjected to a temperature of 1700° C. and and pressure loading of 20,000 psi for a duration of 1 hour. The densities of the samples containing 10 vol. % whiskers were increased to over 98% of theoretical density by the hot isostatic pressing operation.

It will be seen that the present invention provides a method by which complex shapes of SiC whisker-reinforced ceramic articles can be readily fabricated so as to significantly advance the art in the field of structural ceramic materials suitable for use in advanced energy systems such as gas turbines and other heat engines.

I claim:

1. A method for fabricating articles from silicon carbide whiskers and ceramic powder mixtures, comprising the steps of forming a homogenous mixture of about 5 to 10 vol. % silicon carbide whiskers having a monocrystalline structure and dimensions of about 0.6 micrometer in diameter and about 10 to 80 micrometers in length, about 0.5 to 5.0 wt. % yttria, and the balance alumina particulates of an average particle size up to about 1 micrometer, shaping the mixture at a pressed density of at least about 50% of theoretical density, heating the mixture at essentially atmospheric pressure in an inert atmosphere to a temperature adequate to effect liquid-phase sintering of the ceramic particulates to provide a self-supporting composite formed of a ceramic matrix and silicon carbide whiskers dispersed therein with a density of at least about 94% of theoretical density for the combined composite constituents, and thereafter isostatically hot pressing the self-supporting composite at a pressure and temperature adequate to increase the density of the composite to provide an article of at least about 98% of theoretical density.

2. The method claimed in claim 1 wherein the ceramic particulates are $Al_2O_3$ of a size in the range of about 0.1 to 1 micrometer.

3. The method claimed in claim 1 wherein the isostatic hot pressing step is achieved at a pressure of at least 10,000 psi and at a temperature of at least about 1600° C.

4. The method claimed in claim 2 wherein the liquid-phase sintering step is at a temperature of at least about 1760° C.

5. The method claimed in claim 4 wherein the isostatic hot pressing step is achieved at a pressure of at least 10,000 psi and at a temperature of at least about 1600° C.

6. The method claimed in claim 1, wherein the self-supporting composite is isostatically hot pressed without encapsulation in a gas autoclave.

* * * * *